(12) United States Patent
Valente et al.

(10) Patent No.: US 10,527,148 B2
(45) Date of Patent: Jan. 7, 2020

(54) POWER TRANSMITTING COMPONENT INCLUDING A LIMITED SLIP DIFFERENTIAL

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 243 days.

(21) Appl. No.: 15/686,362

(22) Filed: Aug. 25, 2017

(65) Prior Publication Data

US 2019/0063577 A1 Feb. 28, 2019

(51) Int. Cl.
| | |
|---|---|
| *F16H 48/22* | (2006.01) |
| *F16D 13/52* | (2006.01) |
| *F16D 23/12* | (2006.01) |
| *F16H 48/11* | (2012.01) |
| *F16H 48/40* | (2012.01) |

(52) U.S. Cl.
CPC ............. *F16H 48/22* (2013.01); *F16D 13/52* (2013.01); *F16D 23/12* (2013.01); *F16H 48/11* (2013.01); *F16H 48/40* (2013.01); *F16D 2023/123* (2013.01)

(58) Field of Classification Search
CPC ....................................................... F16H 48/22
See application file for complete search history.

(56) References Cited

U.S. PATENT DOCUMENTS

| | | | |
|---|---|---|---|
| 4,781,078 A | 11/1988 | Blessing et al. | |
| 5,269,730 A * | 12/1993 | Hirota | B60K 17/3462 192/84.91 |
| 8,961,353 B2 | 2/2015 | Valente et al. | |

FOREIGN PATENT DOCUMENTS

| | | |
|---|---|---|
| DE | 112004003027 B4 | 5/2011 |
| WO | WO-2017132005 A1 | 8/2017 |

* cited by examiner

*Primary Examiner* — Derek D Knight
(74) *Attorney, Agent, or Firm* — Harness, Dickey & Pierce, P.L.C.

(57) ABSTRACT

A power transmitting component can include a planetary differential including a differential case. The planet carrier can be disposed within the differential case and rotatable about the output axis relative thereto. The first output member can be coupled to the planet carrier for common rotation about the output axis. The second output member can be coupled to the sun gear for common rotation about the output axis. A clutch basket can be fixedly coupled to the planet carrier and disposed within the differential case. A set of first friction plates can be coupled to the clutch basket for common rotation about the output axis therewith and for axial translation relative to the clutch basket. A set of second friction plates can be coupled to the sun gear for common rotation about the output axis and for axial translation relative to the sun gear.

19 Claims, 7 Drawing Sheets

POWER TRANSMITTING COMPONENT INCLUDING A LIMITED SLIP DIFFERENTIAL

FIELD

The present disclosure relates to a power transmitting component including a limited slip differential.

BACKGROUND

This section provides background information related to the present disclosure which is not necessarily prior art.

Modern automotive vehicles typically include a power transmitting component that includes a differential configured to receive input torque and to output differential torque to a pair of outputs. For example, a front or rear differential may output differential torque to left and right drive wheels, or a center differential may output differential torque between front and rear drive systems. Limited slip differentials that can limit the differential of output torque between the two outputs are generally known, but can be complex or too large for certain applications. To this end, there remains a need in the art for development of improved limited slip differentials.

SUMMARY

This section provides a general summary of the disclosure, and is not a comprehensive disclosure of its full scope or all of its features.

In one form, the present disclosure provides for a power transmitting component including a differential case, an internal gear, a sun gear, a planet carrier, a plurality of first planet gears, a plurality of second planet gears, a first output member, a second output member, a clutch basket, a plurality of first friction plates, and a plurality of second friction plates. The differential case can rotate about an output axis. The internal gear can be disposed within the differential case and fixedly coupled to the differential case. The sun gear can be disposed within the differential case and rotatable about the output axis relative to the differential case. The planet carrier can be disposed within the differential case and rotatable about the output axis relative to the differential case. The first and second planet gears can be coupled to the planet carrier for common rotation about the output axis with the planet carrier. Each of the first planet gears can be meshingly engaged with the sun gear and a corresponding one of the second planet gears. Each of the second planet gears can be meshingly engaged with the internal gear. The first output member can be coupled to the planet carrier for common rotation about the output axis. The second output member can be coupled to the sun gear for common rotation about the output axis. The clutch basket can be fixedly coupled to the planet carrier and disposed within the differential case. The second friction plates can be interleaved with the first friction plates. The first friction plates can be coupled to the clutch basket for common rotation about the output axis with the clutch basket and for axial translation relative to the clutch basket. The second friction plates can be coupled to the sun gear for common rotation about the output axis and for axial translation relative to the sun gear.

According to a further embodiment, the internal gear can be integrally formed with the differential case.

According to a further embodiment, the power transmitting component can further include a planet pin. The planet pin can be non-rotatably coupled to the planet carrier. One of the first planet gears or the second planet gears can be supported by the planet pin for rotation relative to the planet carrier.

According to a further embodiment, the planet carrier can include a pin bore and an offset bore. The pin bore can be open into the offset bore. The planet pin can include a lip that engages a surface of the offset bore to inhibit rotation of the planet pin relative to the planet carrier.

According to a further embodiment, the lip can extend a circumferential distance about the planet pin that is less than a full circumference of the planet pin.

According to a further embodiment, the circumferential distance can be greater than half the full circumference of the planet pin.

According to a further embodiment, the planet pin can include a cylindrical body and a flat surface recessed from an outermost cylindrical surface of the cylindrical body.

According to a further embodiment, the power transmitting component can further include an actuator configured to compress the first and second friction plates to transmit torque between the first and second friction plates.

According to a further embodiment, the actuator can be at least partially disposed outside of the differential case.

According to a further embodiment, the actuator can be a ball-ramp actuator.

In another form, the present disclosure provides for a power transmitting component including a differential case, an internal gear, a sun gear, a planet carrier, a plurality of planet pins, a plurality of first planet gears, a plurality of second planet gears, a first output member, and a second output member. The differential case can rotate about an output axis. The internal gear can be disposed within the differential case and be fixedly coupled to the differential case. The sun gear can be disposed within the differential case and be rotatable about the output axis relative to the differential case. The planet carrier can be disposed within the differential case and be rotatable about the output axis relative to the differential case. The planet carrier can include a first end wall that can include a plurality of recesses and a plurality of pin bores. Each pin bore can extend through the first end wall and open into a corresponding one of the recesses. The planet pins can include a cylindrical body and a first end. The cylindrical body can extend through the pin bores. The first end can include a lip that extends radially outward of the pin bore. The lip can extend in a circumferential distance about the cylindrical body that is less than a full circumference of the cylindrical body. The lip can engage a surface of the recess to inhibit rotation of the planet pin relative to the planet carrier. Each of the first and second planet gears can be rotatably supported by a corresponding one of the planet pins. Each of the first planet gears can be meshingly engaged with the sun gear and a corresponding one of the second planet gears. Each of the second planet gears can be meshingly engaged with the internal gear. The first output member can be coupled to the planet carrier for common rotation about the output axis. The second output member can be coupled to the sun gear for common rotation about the output axis.

According to a further embodiment, the internal gear can be integrally formed with the differential case.

According to a further embodiment, each recess can include a cylindrical surface disposed about a central axis that is parallel to and offset from a central axis of the corresponding pin bore. The lip can engage the cylindrical surface.

According to a further embodiment, the circumferential distance can be greater than half the full circumference of the planet pin.

According to a further embodiment, the planet pin can include a flat surface recessed from an outermost cylindrical surface of the cylindrical body.

According to a further embodiment, the power transmitting component can further include a clutch. The clutch can include a plurality of first friction plates and a plurality of second friction plates disposed within the differential case. The first friction plates can be coupled to the planet carrier for common rotation about the output axis with the planet carrier and for axial translation relative to the planet carrier. The second friction plates can be coupled to the sun gear for common rotation about the output axis and for axial translation relative to the sun gear.

According to a further embodiment, the power transmitting component can further include an actuator configured to compress the first and second friction plates to transmit torque between the first and second friction plates.

According to a further embodiment, the actuator can be at least partially disposed outside of the differential case.

In another form, the present disclosure provides for a power transmitting component that can include a housing, a pinion, a differential, a first output member, a second output member, and a linear actuator. The pinion can be disposed within the housing and supported for rotation about a first axis relative to the housing. The differential can include a differential case, an internal gear, a sun gear, a planet carrier, a plurality of planet pins, a plurality of first planet gears, a plurality of second planet gears, a plurality of first friction plates, and a plurality of second friction plates. The differential case can be disposed within the housing and supported for rotation relative to the housing about a second axis that is transverse to the first axis. The internal gear can be disposed within the differential case and fixedly coupled to the differential case. The sun gear can be disposed within the differential case and rotatable about the second axis relative to the differential case. The planet carrier can be disposed within the differential case and rotatable about the second axis relative to the differential case. The planet pins can be non-rotatably coupled to the planet carrier. The first and second planet gears can be supported by the planet pins for common rotation about the second axis with the planet carrier and rotation about the planet pins relative to the planet carrier. Each of the first planet gears can be meshingly engaged with the sun gear and a corresponding one of the second planet gears. Each of the second planet gears can be meshingly engaged with the internal gear. The second friction plates can be interleaved with the first friction plates. The first friction plates can be coupled to the planet carrier for common rotation about the second axis with the planet carrier and for axial translation relative to the planet carrier. The second friction plates can be coupled to the sun gear for common rotation about the second axis and for axial translation relative to the sun gear. The first output member can be coupled to the planet carrier for common rotation about the second axis. The second output member can be coupled to the sun gear for common rotation about the second axis. The linear actuator can be configured to compress the first and second friction plates.

According to a further embodiment, the planet carrier can include a plurality of pin bores and a plurality of offset bores. Each pin bore can open into a corresponding one of the offset bores. Each planet pin can include a lip that engages a peripheral surface of the offset bore to inhibit rotation of the planet pin relative to the planet carrier.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
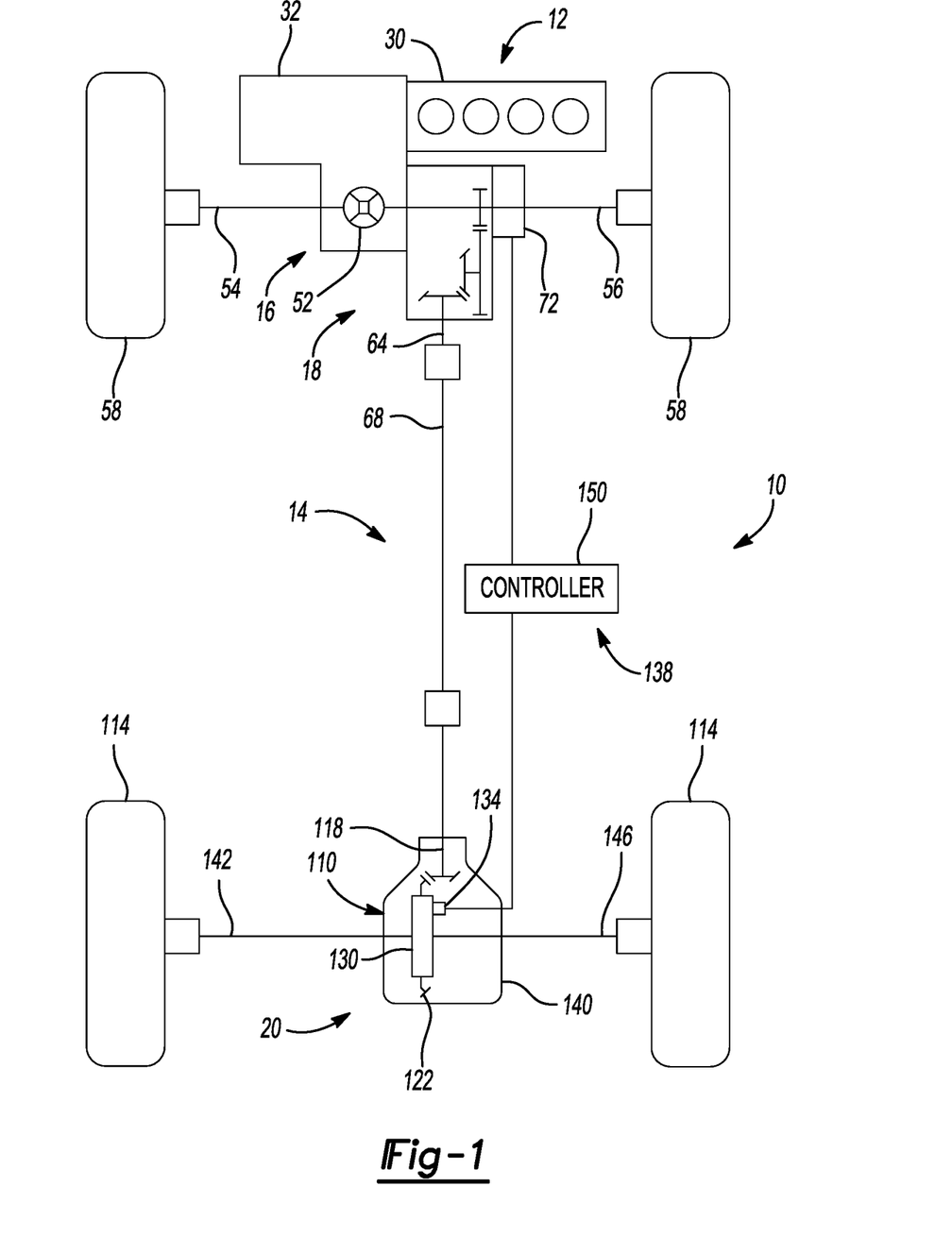
FIG. 1 is a schematic illustration of a motor vehicle equipped with an all-wheel drive driveline including a power transmitting component constructed in accordance with the present teachings.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which outputs rotary power to the primary driveline 16 and the PTU 18. The PTU 18 can be constructed in any suitable manner to be selectively operated to transmit rotary power to the secondary driveline 20. For example, the PTU 18 can be constructed as described in commonly-assigned U.S. Pat. No. 8,961,353, the disclosure of which is incorporated by reference as if fully set forth in detail herein.

In general, the primary driveline 16 can include a first differential 52 and a pair of axle half-shafts (first half-shaft 54 and second half-shaft 56) that can couple corresponding outputs of the first differential 52 to a first set of vehicle wheels 58. Generally, the first differential 52 can be driven by the transmission 32, and can include a means for transmitting rotary power to the first and second half-shafts 54, 56. In the example provided, the rotary power transmitting means is a differential gearset that can permit speed and torque differentiation between the first and second half-shafts 54, 56.

In general, the PTU 18 includes a PTU output member 64 that can be coupled to a propshaft 68 for common rotation about an axis (e.g., parallel to the longitudinal axis of the vehicle 10). The PTU 18 can also include a disconnect mechanism 72 to selectively control power transmission through the PTU 18 to thereby selectively drive the propshaft 68.

In the particular example provided, the secondary driveline 20 includes the propshaft 68 and a rear axle assembly 110 that is configured to receive rotary power from the propshaft 68 and to transmit rotary power to a second set of vehicle wheels 114. The rear axle assembly 110 can generally include an input pinion 118, an input gear 122, a second differential 130, an actuator 134, a control system 138, a housing assembly 140, a third half-shaft 142, and a fourth half-shaft 146.

Figure 2:
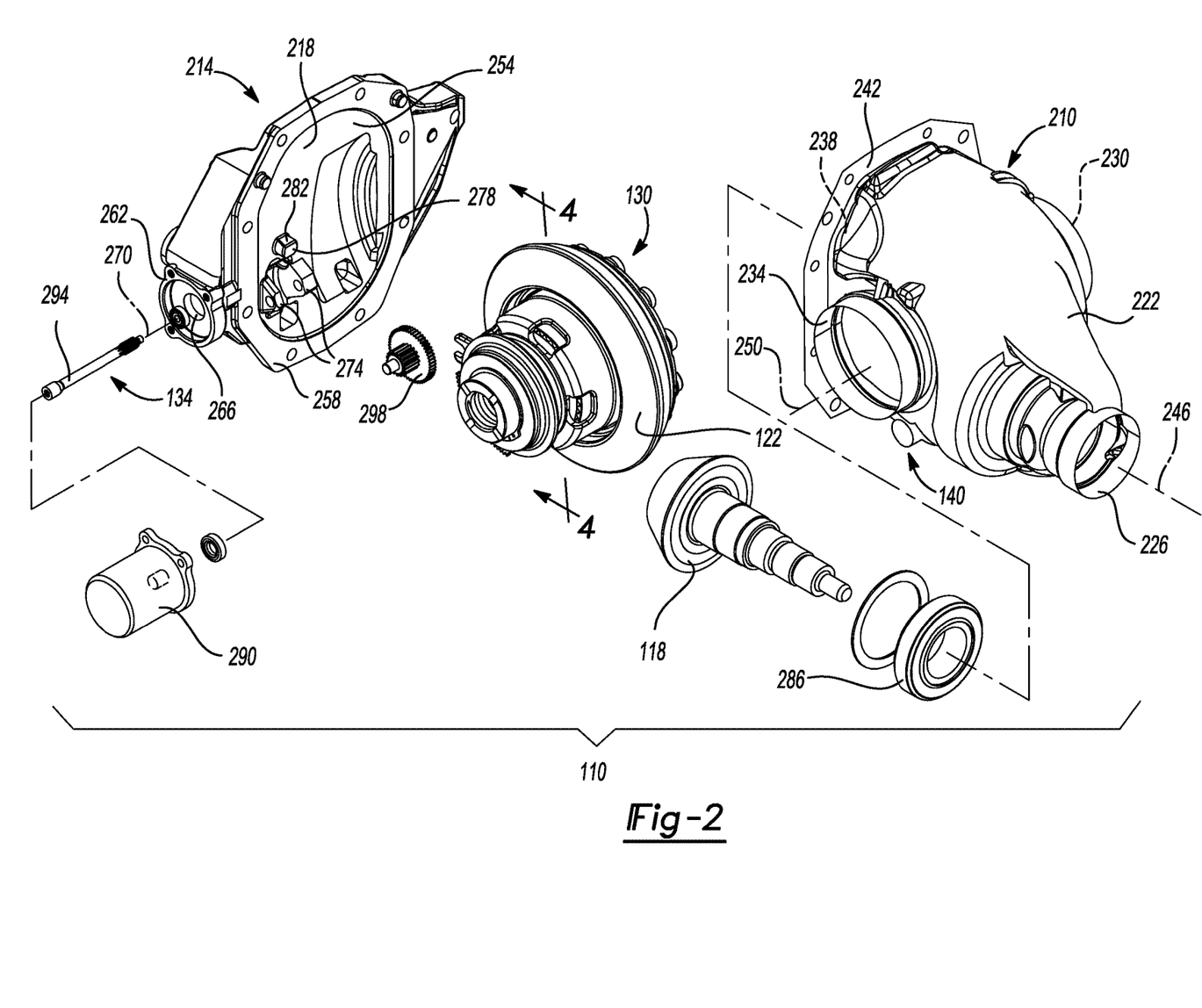
FIG. 2 is an exploded perspective view of a differential of the power transmitting component of FIG. 1.

With additional reference to FIG. 2, the housing assembly 140 can include a main body 210 and a cover body 214. The cover body 214 can be fixedly coupled to the main body 210 such that the main body 210 and the cover body 214 can cooperate to define a housing cavity 218 therein. In the example provided, the main body 210 can include a main wall 222, an input aperture 226, a first output aperture 230, a second output aperture 234, a differential aperture 238, and a main flange 242. The input aperture 226 can extend through a first side of the main wall 222 to be open to the housing cavity 218 and can be disposed coaxially about a first axis 246 (e.g., an input axis). The first output aperture 230 can extend through a second side of the main wall 222 to be open to the housing cavity 218 and can be disposed coaxially about a second axis 250 (e.g., an output axis) that can be transverse (e.g., perpendicular) to the first axis 246. The second output aperture 234 can extend through a third side of the main wall 222, that is opposite the second side of the main wall 222, to be open to the housing cavity 218 and can be disposed coaxially about the second axis 250. The differential aperture 238 can extend through a fourth side of the main wall 222, that is opposite the first side of the main wall 222, to be open to the housing cavity 218. The main flange 242 can be fixedly coupled to the main wall 222 and disposed about the differential aperture 238 to define the perimeter of the differential aperture 238.

The cover body 214 can include a cover wall 254, a cover flange 258, and a motor mount 262. The main wall 222 and the cover wall 254 can cooperate to define the housing cavity 218 on an interior of the housing assembly 140. The cover flange 258 can be fixedly coupled to a first side of the cover wall 254 and configured to fixedly mount to the main flange 242, such as by bolts (not specifically shown) received through apertures in the main flange 242 and the cover flange 258, to fixedly mount the cover body 214 to the main body 210. The motor mount 262 can be fixedly coupled to an exterior of a second side of the cover wall 254 and can include a motor shaft aperture 266. The motor shaft aperture 266 can extend through the motor mount 262 and the cover wall 254 to be open to the housing cavity 218. In the example provided, the motor shaft aperture 266 can be disposed about a third axis 270 that can be parallel to the second axis 250. An interior of the cover wall 254 can include a pair of reduction gear brackets 274 and a slide protrusion 278. The reduction gear brackets 274 can be spaced apart from each other and extend from an interior surface of the cover wall 254 into the housing cavity 218. The slide protrusion 278 can extend from the interior surface of the cover wall 254 into the housing cavity 218 and can be spaced apart from the reduction gear brackets 274. The slide protrusion 278 can include a pair of guide surfaces 282 that can be parallel to the second axis 250.

The input pinion 118 can be coupled to the propshaft 68 for common rotation about the first axis 246 (e.g., parallel to the longitudinal axis of the vehicle 10). The input pinion 118 can extend through the input aperture 226. In the example provided, the input pinion 118 can be supported for rotation about the first axis 246 relative to the housing assembly 140 by one or more bearings 286 disposed between the input pinion 118 and the main body 210 of the housing assembly 140. The input gear 122, the second differential 130, a portion of the actuator 134, and a portion of the input pinion 118 can be disposed within the housing cavity 218. The input gear 122 can be supported for rotation about the second axis 250. The input gear 122 can be meshingly engaged with the input pinion 118 within the housing cavity 218 to receive rotary power from the input pinion 118. In the example provided, the input pinion 118 and input gear 122 form a hypoid gear set, wherein the input gear 122 is a hypoid ring or crown gear and the input pinion 118 includes a mating hypoid pinion gear, though other suitable meshing gear types can be used. In the example provided, the first axis 246 can be perpendicular to and offset from the second axis 152, though other configurations can be used.

Figure 3:
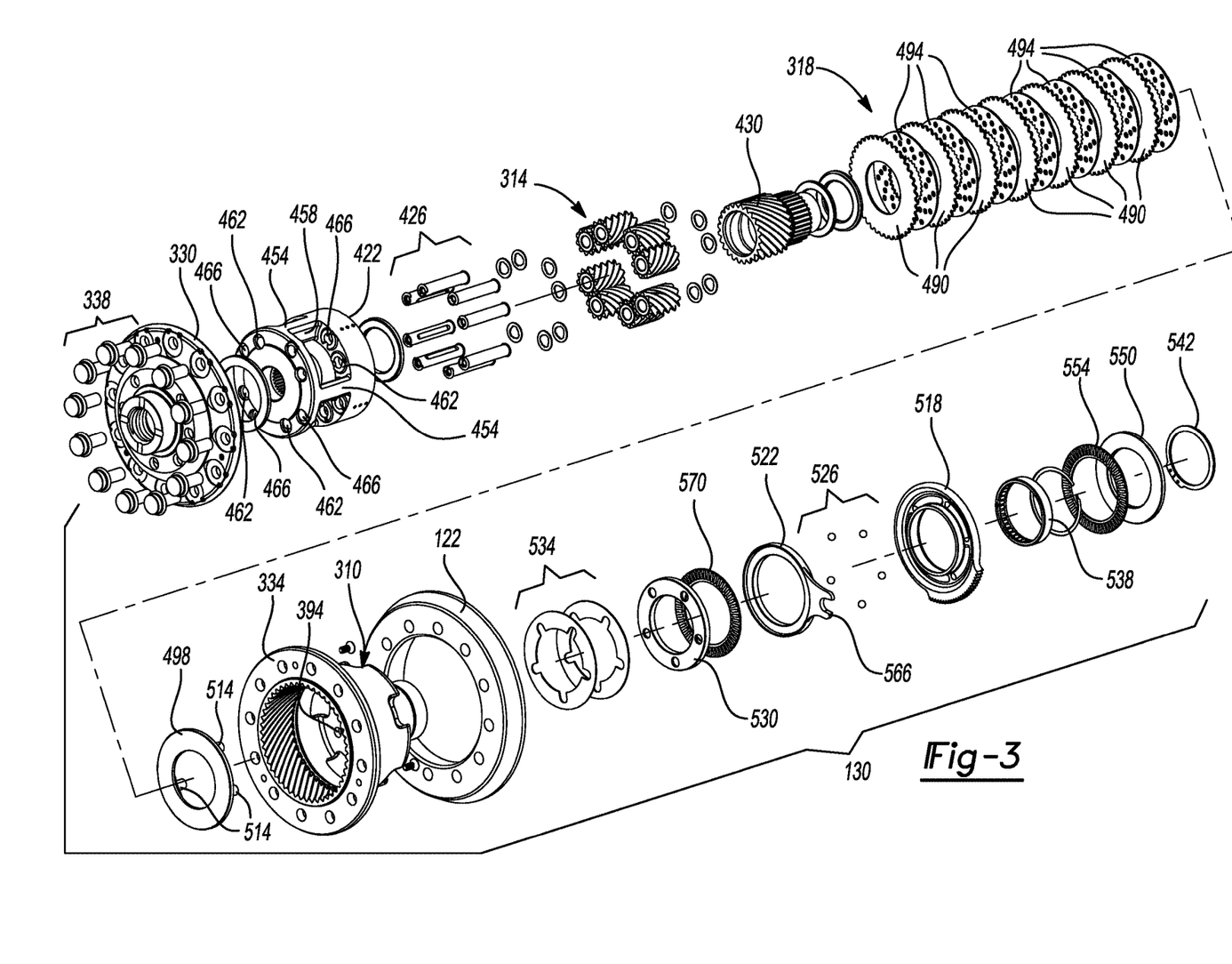
FIG. 3 is an exploded perspective view of the differential of FIG. 2.
Figure 4:
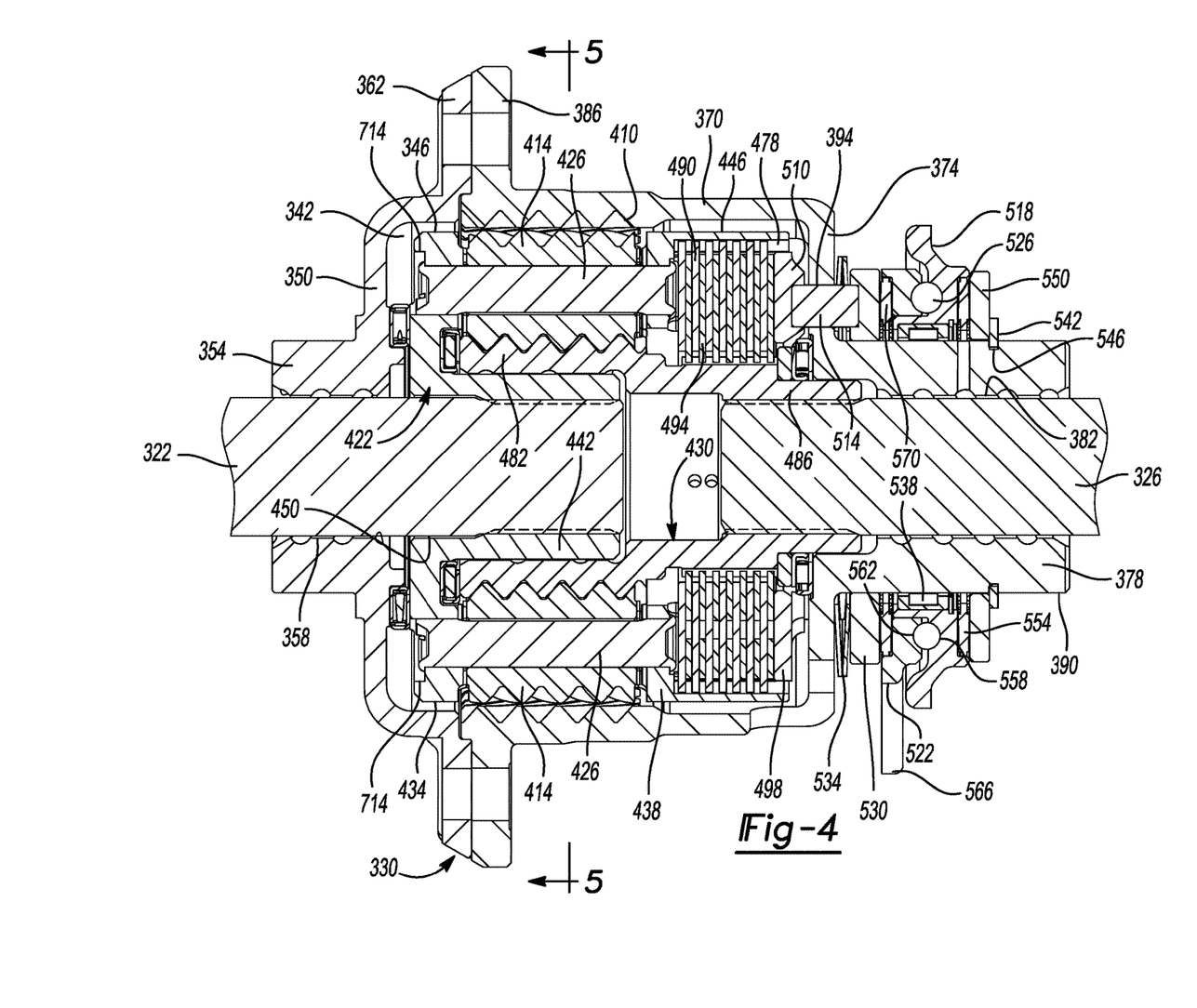
FIG. 4 is a sectional view of the differential of FIG. 2, taken along line 4-4 shown on FIG. 2.
Figure 5:
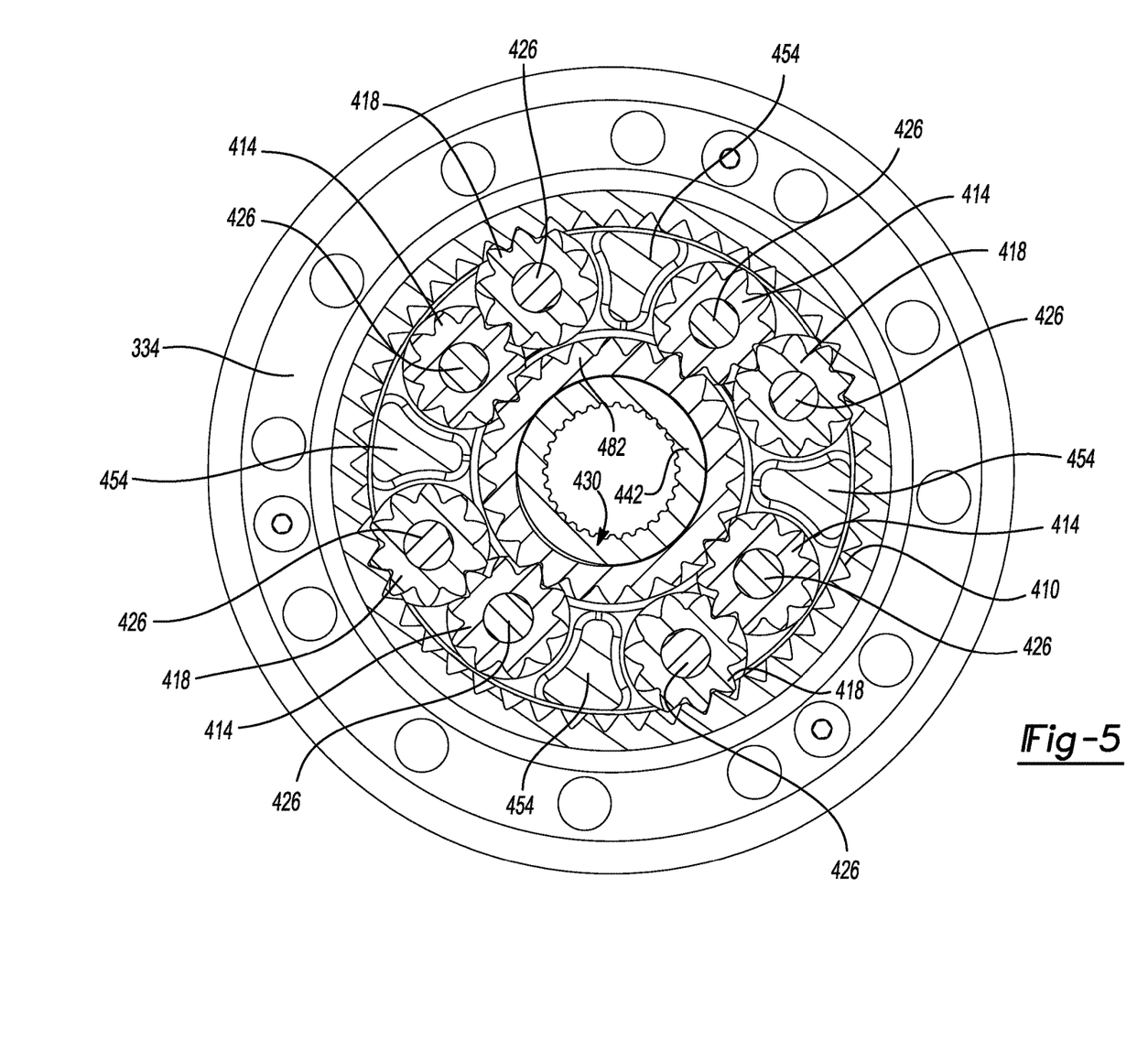
FIG. 5 is a sectional view of the differential of FIG. 2, taken along line 5-5 shown on FIG. 4.

With additional reference to FIGS. 3-5, the second differential 130 can be a planetary differential and can be configured to receive input rotary power from the input gear 122 and output speed and torque differentiation to permit speed and torque differentiation between the third half-shaft 142 (FIG. 1) and the fourth half-shaft 146 (FIG. 1). The third and fourth half-shafts 142, 146 (FIG. 1) can be drivingly coupled to a respective one of the vehicle wheels 114 (FIG. 1).

The second differential 130 can include a differential case assembly 310, a planetary gearset 314, a friction clutch 318, a first output member 322, and a second output member 326. The differential case assembly 310 can include a first end member 330 and a second end member 334 that can be fixedly coupled together (e.g., via bolts 338) to define a differential cavity 342 therein. In the example provided, the first end member 330 can include a first cylindrical wall 346, a first end wall 350, a first boss 354, a first output bore 358, and a first differential flange 362. The first cylindrical wall 346 can be disposed about the second axis 250. The first end wall 350 can extend radially inward from one axial end of the first cylindrical wall 346 such that interior surfaces of the first end wall 350 and first cylindrical wall 346 can define a portion of the differential cavity 342. The first boss 354 can extend axially outward from the first end wall 350 and can have an outer cylindrical surface that can be coaxial with the second axis 250 and radially inward of the first cylindrical wall 346. The first output bore 358 can be coaxial with the second axis 250 and can extend axially through the first end wall 350 and the first boss 354 to be open to the differential cavity 342. The first differential flange 362 can extend radially outward from an axial end of the first cylindrical wall 346 that is opposite the first end wall 350.

In the example provided, the second end member 334 can include a second cylindrical wall 370, a second end wall 374, a second boss 378, a second output bore 382, and a second differential flange 386. The second cylindrical wall 370 can be disposed about the second axis 250. The second end wall 374 can extend radially inward from one axial end of the second cylindrical wall 370 such that the interior surfaces of the second end wall 374 and the second cylindrical wall 370 can define a portion of the differential cavity 342. The second boss 378 can extend axially outward from the second end wall 374 and can have an outer cylindrical surface 390 that can be coaxial with the second axis 250 and radially inward of the second cylindrical wall 370. The second end wall 374 can include a plurality of apply apertures 394 that are radially outward of the outer cylindrical surface 390 of the second boss 378 and extend axially through the second end wall 374 to be open to the differential cavity 342. The apply apertures 394 can be equally spaced about the second end wall 374 in the circumferential direction about the second axis 250. The second output bore 382 can be coaxial with the second axis 250 and can extend axially through the second end wall 374 and second boss 378 to be open to the differential cavity 342. The second differential flange 386 can extend radially outward from an axial end of the second cylindrical wall 370 that is opposite the second end wall 374. The second differential flange 386 can oppose and abut the first differential flange 362. In the example provided, the second differential flange 386 can be fixedly coupled to the first differential flange 362 by the bolts 338 received through corresponding bores in the first and second differential flanges 362, 386. In the example provided, the input gear 122 can be fixedly coupled to the first and second differential flanges 362, 386 by the bolts 338, though other configurations can be used (e.g., welding).

The planetary gearset 314 can include an internal gear 410, a plurality of first planet gears 414, a plurality of second planet gears 418, a planet carrier 422, a plurality of planet pins 426, and a sun gear 430. The internal gear 410 can be disposed about the second axis 250 such that the teeth of the internal gear 410 can be within the differential cavity 342 and can face radially inward toward the second axis 250. The internal gear 410 can be fixedly coupled to the differential case assembly 310 for common rotation about the second axis 250. In the example provided, the internal gear 410 is integrally formed with the second cylindrical wall 370 of the second end member 334.

The planet carrier 422 can be disposed within the differential cavity 342 and can be rotatable relative to the differential case assembly 310. The planet carrier 422 can include a first carrier end wall 434, a second carrier end wall 438, a carrier boss 442, a cylindrical clutch basket 446, and a central bore 450. The second carrier end wall 438 can be axially spaced apart from the first carrier end wall 434 and fixedly coupled to the first carrier end wall 434 by a plurality of cross-members 454 that can extend axially therebetween. The central bore 450 can be coaxial with the second axis 250 and can extend axially through the first carrier end wall 434, the carrier boss 442, and the second carrier end wall 438. The carrier boss 442 can be fixedly coupled to first carrier end wall 434 proximal to the central bore 450 and can extend axially toward the second carrier end wall 438. The carrier boss 442 can include a plurality of internal splines that can face radially inward toward the second axis 250 and matingly engage a plurality of external splines on the first output member 322. The first output member 322 can be disposed coaxially about the second axis 250 and can extend through the first boss 354 (via the first output bore 358). Thus, the first output member 322 can be coupled for common rotation with the planet carrier 422. The first output member 322 can be drivingly coupled to the third half-shaft 142 (FIG. 1) to transmit torque therebetween.

The cross-members 454 can be equally circumferentially spaced apart about the second axis 250 to define a plurality of planet apertures 458 that can extend radially through the planet carrier 422 to be open to the central bore 450 and the differential cavity 342. A plurality of first pin bores 462 and second pin bores 466 can extend axially through the first carrier end wall 434 and the second carrier end wall 438. The first pin bores 462 can be equally circumferentially spaced apart about the second axis 250. The second pin bores 466 can be equally circumferentially spaced apart about the second axis 250. A central axis of the first pin bores 462 can be radially inward of a central axis of the second pin bores 466, relative to the second axis 250.

The clutch basket 446 can be fixedly coupled to the second carrier end wall 438 for common rotation about the second axis 250 and in the example provided, is integrally formed with the second carrier end wall 438. The clutch basket 446 can be disposed about the second axis 250. The second carrier end wall 438 and the clutch basket 446 can define a clutch plate cavity 478 that can be open to the differential cavity 342 on an axial side of the clutch basket 446 opposite the second carrier end wall 438. In the example provided, an interior of the clutch basket 446 can include a plurality of internal splines that can face radially inward toward the second axis 250.

Each of the planet pins 426 can be received through a corresponding one of the first or second pin bores 462, 466. In the example provided, the planet pins 426 are non-rotatably coupled to the planet carrier 422. The planet pins 426 and their connection to the planet carrier 422 are described in greater detail below.

Each of the first planet gears 414 can be disposed about a corresponding one of the planet pins 426 that is received through one of the first pin bores 462. Each first planet gear 414 can be supported by the corresponding planet pin 426 within a corresponding one of the planet apertures 458, such that the first planet gears 414 can rotate relative to the planet pins 426 and the planet carrier 422 about the planet pins 426, while also rotating about the second axis 250 with the planet carrier 422. Each of the second planet gears 418 can be disposed about a corresponding one of the planet pins 426 that is received through one of the second pin bores 466. Each second planet gear 418 can be supported by the corresponding planet pin 426 within a corresponding one of the planet apertures 458, such that the second planet gears 418 can rotate relative to the planet pins 426 and the planet carrier 422 about the planet pins 426, while also rotating about the second axis 250 with the planet carrier 422. Thus, in the example provided, one of the first planet gears 414 and one of the second planet gears 418 can be located in each planet aperture 458. Each first planet gear 414 can be meshingly engaged with the corresponding one of the second planet gears 418 within the same planet aperture 458. The second planet gears 418 can be meshingly engaged with the internal gear 410.

Figure 6:
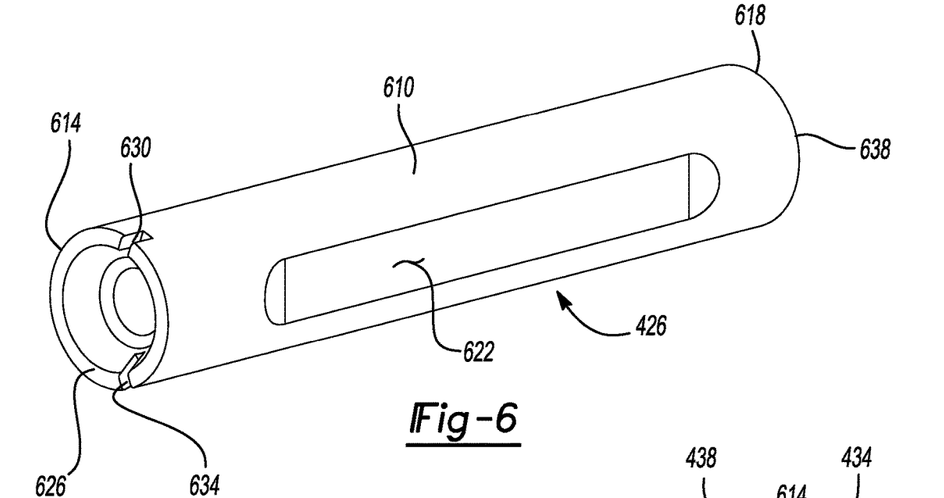
FIG. 6 is a perspective view of a planetary pin of the differential of FIG. 2, shown in an undeformed state.
Figure 7:
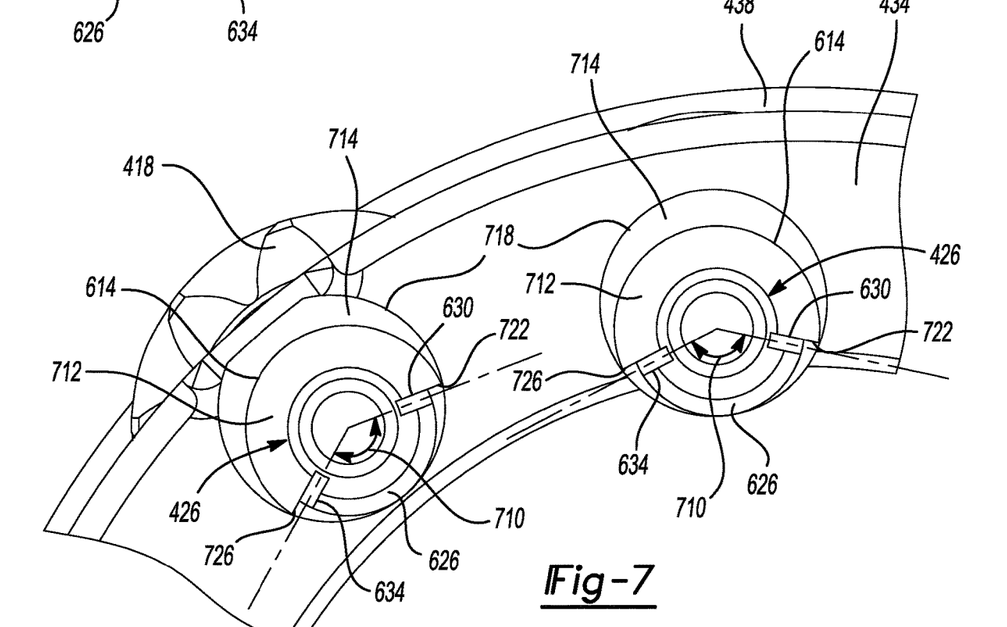
FIG. 7 is a plan view of a portion of the differential of FIG. 2, illustrating an end of a pair of the planetary pins installed in the differential, the planetary pins being shown in a deformed state.
Figure 8:
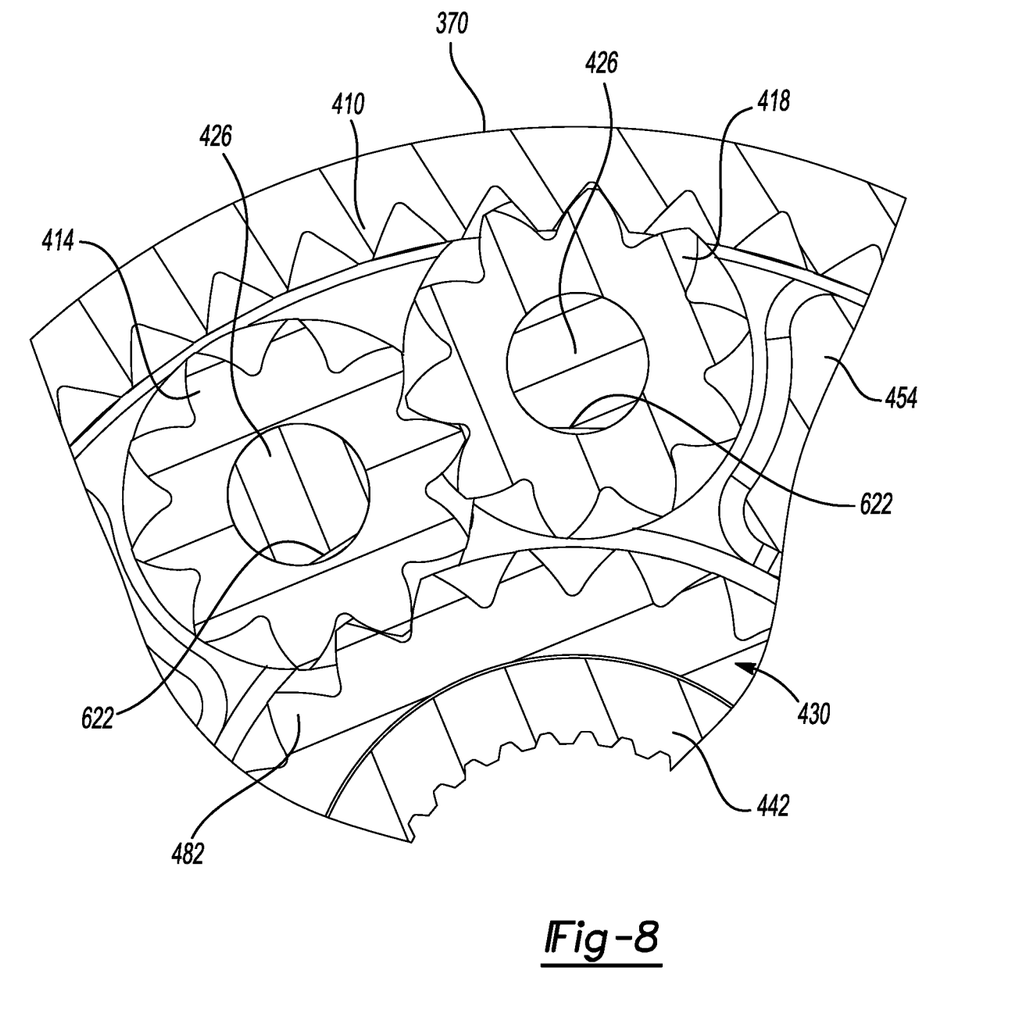
FIG. 8 is a sectional view of a portion of the differential of FIG. 2, illustrating a pair of planet gears mounted on the planet pins of FIG. 7.

With reference to FIGS. 6-8, each planet pin 426 can have a generally cylindrical body 610, a first end 614, and a second end 618. The cylindrical body 610 can include a flat surface 622 on one side of the planet pin 426. The flat surface 622 can be recessed from the outer cylindrical surface of the planet pin 426 and can extend longitudinally parallel to the central axis of the planet pin 426. The planet pin 426 illustrated in FIG. 6 is shown in a pre-assembled condition, wherein the first and second ends 614, 618 can be in a pre-deformed state. In the pre-deformed state, the first end 614 can have a first annular rim 626 that is coaxial with the cylindrical body 610 and extends axially from the cylindrical body 610. The first end 614 can include a pair of slots 630, 634 that can be open at a terminal end of the first annular rim 626 and can extend axially toward the cylindrical body 610. In the example provided, the slots 630, 634 are not diametrically opposite each other. In other words, an angle 710 (FIG. 7) between the slots 630, 634 is less than 180 degrees and the first annular rim 626 has a shorter arc length between the slots within the angle 710, and has a longer arc length between the slots outside the angle 710. In the example provided, the flat surface 622 is located within the angular range of the angle 710, though other configurations can be used.

The second end 618 in the pre-deformed state can be similar to the first end 614 in its pre-deformed state. The second end 618 in the pre-deformed state can have a second annular rim 638 similar to the first annular rim 626. In the example provided, the second end 618 does not include slots similar to slots 630, 634. In an alternative construction, not specifically shown, the second end 618 can include slots similar to slots 630, 634.

With additional reference to FIGS. 4 and 7, the first carrier end wall 434 can include a plurality of recesses or offset bores 714, each offset bore 714 corresponding to one of the first or second pin bores 462, 466. The offset bores 714 are open on a side of the first carrier end wall 434 that faces axially away from the second carrier end wall 438. The offset bores 714 do not extend axially through the first carrier end wall 434. The offset bores 714 overlap with the corresponding first or second pin bore 462, 466, such that the first or second pin bore 462, 466 can be entirely within a cylindrical perimeter surface 718 of the offset bore 714. In other words, each offset bore 714 has a central axis that is offset from the central axis of the corresponding first or second pin bore 462, 466 and that first or second pin bore 462, 466 opens into that corresponding offset bore 714.

When each planet pin 426 is inserted into the corresponding first or second pin bore 462, 466, the first end 614 of each planet pin 426 can be disposed within the offset bore 714. As best shown in FIG. 8, the flat surface 622 can be aligned to face a desired direction, such as a location of least loading by the first and second planet gears 414, 418 during operation, so that lubricant oil can be best distributed via the flat surface 622. With the flat surface 622 oriented in the desired location, the portion of the first annular rim 626 that is outside the angle 710 can be deformed within the offset bore 714 to form a lip 712 that can engage the first carrier end wall to inhibit axial movement back through the first or second pin bore 462, 466. The portion of the first annular rim 626 within the angle 710 can remain undeformed. In an alternative configuration, not specifically shown, the portion of the first annular rim 626 within the angle 710 can be removed.

Since the central axis of the planet pin 426 is offset from the central axis of the offset bore 714, edges 722 and 726 of the lip 712 (e.g., at the slots 630, 634) can engage the cylindrical perimeter surface 718 to prevent rotation of the planet pin 426 relative to the planet carrier 422. As best shown in FIG. 4, the second annular rim 638 can also be deformed to overhang the second carrier end wall 438 to inhibit axial movement of the planet pin 426 in the opposite axial direction. Thus, the planet pin 426 can be axially and rotationally constrained relative to the planet carrier 422.

Returning to FIGS. 3-5, the sun gear 430 can be coaxially disposed about the second axis 250 and can be rotatable relative to the planet carrier 422 and the differential case assembly 310. The sun gear 430 can include a gear portion 482 and an output portion 486. The gear portion 482 can have a plurality of external teeth that face radially outward relative to the second axis 250 and are meshingly engaged with the first planet gears 414. In the example provided, the gear portion 482 can be located radially about the carrier boss 442 and be rotatable relative to the carrier boss 442.

The output portion 486 of the sun gear 430 can be fixedly coupled to the gear portion 482 for common rotation about the second axis 250. The output portion 486 can extend axially through the second carrier end wall 438 into the clutch plate cavity 478. In the example provided, the output portion 486 also extends axially into a portion of the second boss 378, though other configurations can be used. The output portion 486 can define a plurality of external splines that can face radially outward relative to the second axis 250. The output portion 486 can also define a plurality of internal splines that can face radially inward toward the second axis 250 and matingly engage a plurality of external splines on the second output member 326. The second output member 326 can be disposed coaxially about the second axis 250 and can extend through the second boss 378 (via the second output bore 382). Thus, the second output member 326 can be coupled to the sun gear 430 for common rotation therewith. The second output member 326 can be drivingly coupled to the fourth half-shaft 146 (FIG. 1) to transmit torque therebetween.

The friction clutch 318 can include the clutch basket 446 of the planet carrier 422, the output portion 486 of the sun gear 430, a plurality of first friction plates 490, a plurality of second friction plates 494, and an apply plate 498. The first and second friction plates 490, 494 can be disposed within the clutch plate cavity 478. The first friction plates 490 can be annular in shape, disposed about the second axis 250, and have a plurality of external splines that can matingly engage the internal splines of the clutch basket 446. Thus, the first friction plates 490 can be coupled to the clutch basket 446 for common rotation about the second axis 250, while being axially slidable relative to the clutch basket 446. The second friction plates 494 can be annular in shape, disposed about the second axis 250, and be interleaved with the first friction plates 490. The second friction plates 494 can have a plurality of internal splines that can matingly engage the external splines of the output portion 486 of the sun gear 430. Thus, the second friction plates 494 can be coupled to the output portion 486 of the sun gear 430 for common rotation about the second axis 250, while being axially slidable relative to the output portion 486.

The apply plate 498 can include an annular member 510 and a plurality of posts 514. The annular member 510 can be disposed about the second axis 250 radially outward of the output portion 486, within the differential cavity 342, and can be disposed at least partially within the clutch plate cavity 478. The annular member 510 can be configured to engage an adjacent one of the first or second friction plates 490, 494. The posts 514 can be fixedly coupled to the annular member 510 for common rotation about the second axis 250. The posts 514 can be circumferentially spaced about the second axis 250 and each post 514 can extend through a corresponding one of the apply apertures 394 of the second end wall 374 to extend exterior of the differential case assembly 310. Thus, the apply plate 498 can be non-rotatably coupled to the differential case assembly 310 while being axially slidable relative to the differential case assembly 310. The apply plate 498 can be configured to move axially along the second axis 250 between an extended position, wherein the annular member compresses the first and second friction plates 490, 494 together to transmit torque therebetween, and a retracted position, wherein the annular member 510 is further from the second carrier end wall 438 than when in the extended position.

In the example provided, the actuator 134 can be a ball-ramp actuator that includes an electric motor 290 (FIG. 2), a first ramp member 518, a second ramp member 522, a plurality of spherical balls 526, an outer ring 530, and a return spring 534. In an alternative construction, not specifically shown, the actuator 134 can be a different type of linear actuator, such as a solenoid actuator, or hydraulic actuator, for example.

Returning to FIG. 2, the motor 290 can be fixedly mounted to the motor mount 262 such that an output shaft 294 of the motor 290 can be received in the motor shaft aperture 266 and can extend into the housing cavity 218. In the example provided, the actuator 134 includes a reduction gear set 298 that is rotatably mounted to the reduction gear brackets 274 within the housing cavity 218. The reduction gear set 298 can include a first set of teeth that meshingly engage teeth on the output shaft 294 of the motor 290. The reduction gear set 298 can include a second set of teeth, that can have fewer teeth than the first set of teeth of the reduction gear set 298, which can meshingly engage teeth on the first ramp member 518, though other configurations can be used.

Returning to FIGS. 3 and 4, the first ramp member 518 can be disposed about the second boss 378 and can be supported thereon for rotation relative to the planet carrier 422 by a bearing 538. The first ramp member 518 can be axially retained on the second boss 378 to prevent the first ramp member 518 from moving axially in the direction away from the second end wall 374. In the example provided, a snap ring 542 is partially received in a groove 546 formed in the outer surface of the second boss 378, and a stop plate 550 and a thrust bearing 554 can be axially between the first ramp member 518 and the snap ring 542 to inhibit axial movement of the first ramp member 518. The first ramp member 518 can include a plurality of ball tracks 558 in which a corresponding one of the balls 526 can be disposed.

The second ramp member 522 can also include a plurality of ball tracks 562 in which a corresponding one of the balls 526 can be disposed. The second ramp member 522 can be non-rotatably coupled to the housing assembly 140, while being axially slidable relative thereto. In the example provided, the second ramp member 522 can include a guide fork 566 that slidably engages the guide surfaces 282 of the slide protrusion 278. The ball tracks 558, 562 of the first and second ramp members 518, 522 can be ramped such that rotation of the first ramp member 518 can cause axial movement of the second ramp member 522 away from the first ramp member 518.

The outer ring 530 can be disposed about the second boss 378 axially between the posts 514 and the second ramp member 522. The outer ring 530 can be coupled to the posts 514 for common axial movement. In the example provided, a thrust bearing 570 can be disposed axially between the outer ring 530 and the second ramp member 522. Axial movement of the second ramp member 522 toward the second end wall 374 can axially move the outer ring 530, which can push the posts to move the apply plate 498 toward the extended position. In the example provided, the return spring 534 can be disposed about the second boss 378 and axially between the second end wall 374 and the outer ring 530. The return spring 534 can bias the outer ring 530 axially away from the second end wall 374 to bias the apply plate 498 toward the retracted position.

Returning to FIG. 1, the control system 138 can include a control module 150 that can be in communication with the motor 290 (FIG. 2) to control operation of the motor 290 (FIG. 2) and thus control operation of the friction clutch 318 (FIGS. 3 and 4). The control module 150 can be configured to control the rotation of the motor 290 (FIG. 2) and can be configured to control the angular position of the motor output shaft 294 (FIG. 2), such that the control module 150 can operate to position the apply plate 498 (FIGS. 3 and 4) in any number of axial positions between the extended position and the retracted position. Since the friction clutch 318 (FIGS. 3 and 4) transfers torque via friction between the first and second friction plates 490, 494 (FIGS. 3 and 4), the friction clutch 318 (FIGS. 3 and 4) can provide a "limited slip" operation to the second differential 130, wherein the minimum amount of "slip" can depend on the maximum frictional holding power of the first and second friction plates 490, 494 (FIGS. 3 and 4). In addition, the control module 150 can be configured to control the actuator 134 to vary the amount of "slip" by controlling the engagement force applied to the first and second friction plates 490, 494 (FIGS. 3 and 4). The control module 150 can also be in communication with the disconnect mechanism 72 of the PTU 18 to control the disconnect mechanism 72 to selectively provide power to the propshaft 68.

While the second differential 130 is described herein as part of the rear axle assembly 110, the second differential 130 can be used in other configurations, such as in a front wheel drive system, a rear wheel drive system, the front drive of an all wheel drive system (e.g., in place of the first differential 52), or a center differential (not shown) that can split power between the front and rear wheels for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power transmitting component comprising:
a differential case configured to rotate about an output axis;
an internal gear disposed within the differential case and fixedly coupled to the differential case;
a sun gear disposed within the differential case and rotatable about the output axis relative to the differential case;
a planet carrier disposed within the differential case and rotatable about the output axis relative to the differential case;
a plurality of first planet gears and a plurality of second planet gears, the first and second planet gears being coupled to the planet carrier for common rotation about the output axis with the planet carrier, each of the first planet gears being meshingly engaged with the sun gear and a corresponding one of the second planet gears, each of the second planet gears being meshingly engaged with the internal gear;
a planet pin, the planet pin being non-rotatably coupled to the planet carrier, wherein one of the first planet gears or the second planet gears is supported by the planet pin for rotation relative to the planet carrier;
a first output member and a second output member, the first output member coupled to the planet carrier for common rotation about the output axis, the second output member coupled to the sun gear for common rotation about the output axis;
a clutch basket fixedly coupled to the planet carrier and disposed within the differential case; and
a plurality of first friction plates and a plurality of second friction plates interleaved with the first friction plates, the first friction plates being coupled to the clutch basket for common rotation about the output axis with the clutch basket and for axial translation relative to the clutch basket, the second friction plates being coupled to the sun gear for common rotation about the output axis and for axial translation relative to the sun gear;
wherein the internal gear is integrally formed with the differential case; and
wherein the planet carrier includes a pin bore and an offset bore, the pin bore opening into the offset bore, and the planet pin including a lip that engages a surface of the offset bore to inhibit rotation of the planet pin relative to the planet carrier.

2. The power transmitting component of claim 1, wherein the lip extends a circumferential distance about the planet pin that is less than a full circumference of the planet pin.

3. The power transmitting component of claim 2, wherein the circumferential distance is greater than half the full circumference of the planet pin.

4. The power transmitting component of claim 1, further comprising an actuator configured to compress the first and second friction plates to transmit torque between the first and second friction plates.

5. The power transmitting component of claim 4, wherein the actuator is at least partially disposed outside of the differential case.

6. The power transmitting component of claim 5, wherein the actuator is a ball-ramp actuator.

7. A power transmitting component comprising:
a differential case configured to rotate about an output axis;
an internal gear disposed within the differential case and fixedly coupled to the differential case;
a sun gear disposed within the differential case and rotatable about the output axis relative to the differential case;
a planet carrier disposed within the differential case and rotatable about the output axis relative to the differential case;
a plurality of first planet gears and a plurality of second planet gears, the first and second planet gears being coupled to the planet carrier for common rotation about the output axis with the planet carrier, each of the first planet gears being meshingly engaged with the sun gear and a corresponding one of the second planet gears, each of the second planet gears being meshingly engaged with the internal gear;
a planet pin, the planet pin being non-rotatably coupled to the planet carrier, wherein one of the first planet gears or the second planet gears is supported by the planet pin for rotation relative to the planet carrier;
a first output member and a second output member, the first output member coupled to the planet carrier for common rotation about the output axis, the second output member coupled to the sun gear for common rotation about the output axis;
a clutch basket fixedly coupled to the planet carrier and disposed within the differential case; and
a plurality of first friction plates and a plurality of second friction plates interleaved with the first friction plates, the first friction plates being coupled to the clutch basket for common rotation about the output axis with the clutch basket and for axial translation relative to the clutch basket, the second friction plates being coupled to the sun gear for common rotation about the output axis and for axial translation relative to the sun gear;
wherein the internal gear is integrally formed with the differential case; and
wherein the planet pin includes a cylindrical body and a flat surface recessed from an outermost cylindrical surface of the cylindrical body.

8. The power transmitting component of claim 7, further comprising an actuator configured to compress the first and second friction plates to transmit torque between the first and second friction plates.

9. The power transmitting component of claim 8, wherein the actuator is at least partially disposed outside of the differential case.

10. The power transmitting component of claim 9, wherein the actuator is a ball-ramp actuator.

11. A power transmitting component comprising:
a differential case configured to rotate about an output axis;
an internal gear disposed within the differential case and fixedly coupled to the differential case;
a sun gear disposed within the differential case and rotatable about the output axis relative to the differential case;
a planet carrier disposed within the differential case and rotatable about the output axis relative to the differential case, the planet carrier including a first end wall that includes a plurality of recesses and a plurality of pin bores, each pin bore extending through the first end wall and opening into a corresponding one of the recesses;

a plurality of planet pins including a cylindrical body and a first end, the cylindrical body extending through the pin bores, the first end including a lip that extends radially outward of the pin bore, the lip extending a circumferential distance about the cylindrical body that is less than a full circumference of the cylindrical body, the lip engaging a surface of the recess to inhibit rotation of the planet pin relative to the planet carrier;

a plurality of first planet gears and a plurality of second planet gears, each of the first and second planet gears being rotatably supported by a corresponding one of the planet pins, each of the first planet gears being meshingly engaged with the sun gear and a corresponding one of the second planet gears, each of the second planet gears being meshingly engaged with the internal gear; and a first output member and a second output member, the first output member coupled to the planet carrier for common rotation about the output axis, the second output member coupled to the sun gear for common rotation about the output axis.

12. The power transmitting component of claim 11, wherein the internal gear is integrally formed with the differential case.

13. The power transmitting component of claim 11, wherein each recess includes a cylindrical surface disposed about a central axis that is parallel to and offset from a central axis of the corresponding pin bore, wherein the lip engages the cylindrical surface.

14. The power transmitting component of claim 11, wherein the circumferential distance is greater than half the full circumference of the planet pin.

15. The power transmitting component of claim 11, wherein the planet pin includes a flat surface recessed from an outermost cylindrical surface of the cylindrical body.

16. The power transmitting component of claim 11, further comprising a clutch including a plurality of first friction plates and a plurality of second friction plates disposed within the differential case, the first friction plates being coupled to the planet carrier for common rotation about the output axis with the planet carrier and for axial translation relative to the planet carrier, the second friction plates being coupled to the sun gear for common rotation about the output axis and for axial translation relative to the sun gear.

17. The power transmitting component of claim 16, further comprising an actuator configured to compress the first and second friction plates to transmit torque between the first and second friction plates.

18. The power transmitting component of claim 16, wherein the actuator is at least partially disposed outside of the differential case.

19. A power transmitting component comprising:

a housing;

a pinion disposed within the housing and supported for rotation about a first axis relative to the housing;

a differential including:

a differential case disposed within the housing and supported for rotation relative to the housing about a second axis that is transverse to the first axis;

an internal gear disposed within the differential case and fixedly coupled to the differential case;

a sun gear disposed within the differential case and rotatable about the second axis relative to the differential case;

a planet carrier disposed within the differential case and rotatable about the second axis relative to the differential case;

a plurality of planet pins non-rotatably coupled to the planet carrier;

a plurality of first planet gears and a plurality of second planet gears, the first and second planet gears being supported by the planet pins for common rotation about the second axis with the planet carrier and rotation about the planet pins relative to the planet carrier, each of the first planet gears being meshingly engaged with the sun gear and a corresponding one of the second planet gears, each of the second planet gears being meshingly engaged with the internal gear; and a plurality of first friction plates and a plurality of second friction plates interleaved with the first friction plates, the first friction plates being coupled to the planet carrier for common rotation about the second axis with the planet carrier and for axial translation relative to the planet carrier, the second friction plates being coupled to the sun gear for common rotation about the second axis and for axial translation relative to the sun gear;

a first output member and a second output member, the first output member coupled to the planet carrier for common rotation about the second axis, the second output member coupled to the sun gear for common rotation about the second axis; and a linear actuator configured to compress the first and second friction plates;

wherein the planet carrier includes a plurality of pin bores and a plurality of offset bores, each pin bore opening into a corresponding one of the offset bores, wherein each planet pin includes a lip that engages a peripheral surface of the offset bore to inhibit rotation of the planet pin relative to the planet carrier.

\* \* \* \* \*